United States Patent
Aoyama et al.

(10) Patent No.: US 9,639,317 B2
(45) Date of Patent: May 2, 2017

(54) IMAGE OUTPUT APPARATUS, IMAGE OUTPUT METHOD AND PROGRAM-STORED COMPUTER READABLE STORAGE MEDIUM WITH OUTPUT CONTROL BASED ON REGION/LANGUAGE SETTINGS

(71) Applicant: Konica Minolta, Inc., Tokyo (JP)

(72) Inventors: Yasufumi Aoyama, Tokyo (JP); Masahiro Ozawa, Tokyo (JP); Hiroshi Nogawa, Tokyo (JP); Kunikazu Satou, Tokyo (JP); Takahisa Matsunaga, Tokyo (JP); Tetsuren Ri, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 59 days.

(21) Appl. No.: 13/893,086

(22) Filed: May 13, 2013

(65) Prior Publication Data

US 2013/0308149 A1 Nov. 21, 2013

(30) Foreign Application Priority Data

May 15, 2012 (JP) ................................ 2012-111324

(51) Int. Cl.
*G06F 3/12* (2006.01)
*G06F 17/22* (2006.01)
*G06F 17/27* (2006.01)

(52) U.S. Cl.
CPC .......... *G06F 3/1298* (2013.01); *G06F 3/1208* (2013.01); *G06F 3/1246* (2013.01);
(Continued)

(58) Field of Classification Search
CPC combination set(s) only.
See application file for complete search history.

(56) References Cited

U.S. PATENT DOCUMENTS 8,843,360 B1 * 9/2014 Johnston ............... G06F 9/4448
704/1
2005/0264830 A1 * 12/2005 Une et al. ..................... 358/1.1
(Continued)

FOREIGN PATENT DOCUMENTS

EP  1 598 752 A2  11/2005
JP  2002-175228  6/2002
(Continued)

OTHER PUBLICATIONS

Notification of Reasons for Refusal issued by JPO for appl. No. 2012-111324, dispatched Jul. 15, 2014, 2 pgs.
(Continued)

*Primary Examiner* — Henok A Shiferaw
(74) *Attorney, Agent, or Firm* — Squire Patton Boggs (US) LLP (57) ABSTRACT

An image output apparatus includes an image output unit, a presumption unit, a comparison unit and an output control unit. The image output unit outputs, in a predetermined format, an image of a content of a document file. The presumption unit presumes a first region/language setting of a document file created environment where the document file is created. The comparison unit compares the first region/language setting with a second region/language setting of the image output apparatus. The output control unit makes the image output unit output the image of the content of the document file by using a region/language setting selected from the region/language settings, which are compared with each other by the comparison unit, on the basis of a result of the comparison by the comparison unit in accordance with a predetermined selection condition.

23 Claims, 9 Drawing Sheets

(52) U.S. Cl.
CPC ........ *G06F 3/1285* (2013.01); *G06F 17/2247* (2013.01); *G06F 17/275* (2013.01)

(56) References Cited

U.S. PATENT DOCUMENTS

| | | | | |
|---|---|---|---|---|
| 2006/0110171 | A1* | 5/2006 | Miyazawa | H04N 1/00209 399/8 |
| 2007/0081179 | A1* | 4/2007 | Nishida | G06F 17/275 358/1.11 |
| 2008/0028304 | A1* | 1/2008 | Levantovsky et al. | 715/269 |
| 2008/0301277 | A1* | 12/2008 | Tsujiguchi | 709/223 |
| 2011/0161842 | A1* | 6/2011 | Prebble | G06F 3/1206 715/760 |
| 2013/0211814 | A1* | 8/2013 | Derks | G06Q 30/02 704/2 |

FOREIGN PATENT DOCUMENTS

| | | |
|---|---|---|
| JP | 2006-53892 | 2/2006 |
| JP | 2006-321190 | 11/2006 |
| JP | 2007-193719 | 8/2007 |
| JP | 2008-90790 | 4/2008 |

OTHER PUBLICATIONS

Translation of the Notification of Reasons for Refusal issued by JPO for appl. No. 2012-111324, dispatched Jul. 15, 2014, 6 pgs.

\* cited by examiner

¥xl¥styles.xml

```
                                              c
<?xml version="1.0" encoding="UTF-8" standalone="yes" ?>
<styleSheet
xmlns="http://schemas.openxmlformats.org/spreadsheetml/2006/main">
   <numFmts count="1">                                              a1
      <numFmt formatCode="[$-F800]dddd¥,¥ mmmm ¥ dd¥,¥ yyyy"
numFmtId="176"/>
      <numFmt formatCode="[$-411]ggge"年"m"月"d"日";@" numFmtId="177"/>
   :                                                                a2
   </numFmts>
   <fonts count="2">
      <font>
         <sz val="11"/>
         <color theme="1"/>
         <name val="MS Pゴシック"/>           d
   :
<cellXfs count="5">
   <xf numFmtId="0" borderId="0" fillId="0" fontId="0" xfId="0">
      <alignment vertical="center"/>
   </xf>
   <xf numFmtId="176" borderId="0" fillId="0" fontId="0" xfId="0"
applyNumberFormat="1">
      <alignment vertical="center" />
   </xf>
   <xf numFmtId="177" borderId="0" fillId="0" fontId="0" xfId="0"      b
applyNumberFormat="1">
      <alignment vertical="center" />
   </xf>
   :
```

FIG.6

¥xl¥worksheets¥sheet1.xml

```
<?xml version="1.0" encoding="UTF-8" standalone="yes" ?>
<worksheet
xmlns:r="http://schemas.openxmlformats.org/officeDocument/2006/relationships"
xmlns:r="http://schemas.openxmlformats.org/spreadsheetml/2006/main">
 <dimension ref="A1:D31"/>
 :
  <sheetData>
    <row r="1" spans="1:4">
      <c r="A1" s="1">                          ─┐
       <f ca="1">TODAY()</f>                     │ ─── e
       <v>40996</v>                              │
      </c>                                      ─┘
    :
    </row>
    :
  </sheetData>
```

| SAME LOCALE | USE LOCALE SETTING OF IMAGE FORMING APPARATUS |
|---|---|
| DIFFERENT LOCALE | USE LOCALE SETTING OF DOCUMENT FILE CREATED ENVIRONMENT |
| IMPOSSIBLE TO PRESUME LOCALE OF DOCUMENT FILE CREATED ENVIRONMENT | USE LOCALE SETTING OF IMAGE FORMING APPARATUS |

FIG.11

IMAGE OUTPUT APPARATUS, IMAGE OUTPUT METHOD AND PROGRAM-STORED COMPUTER READABLE STORAGE MEDIUM WITH OUTPUT CONTROL BASED ON REGION/LANGUAGE SETTINGS

BACKGROUND OF THE INVENTION

1. Field of the Invention

The present invention relates to an image output apparatus, an image output method and a program-stored computer readable storage medium.

2. Description of the Related Art

There has been a case where output from a computer is performed depending on its region/language setting, namely, locale setting. A user sets a region and a language (locale setting), so that, for example, dates, time, currency symbols ($, ¥, £, and the like) and a notational system for numerical values (for example, where to put ",") are outputted to be displayed in accordance with the language of the region and a preset format automatically.

The locale setting is also used for description in a document file. (Document files are general files including text data, hereinafter.) Output can be performed on the basis of the locale setting with respect to various types of application software (spreadsheet software) used for various calculation analyses, data aggregation, database creation and the like for statistical analyses of numerical value data, the application software using spreadsheets respectively including a plurality of cells.

In recent years, an attempt has been made to standardize output formats of the spreadsheet software. Using a standard output format provides document file compatibility between different computers or different types of software, and also makes it easy to develop related software. OOXML (Office Open XML) used for Excel (Microsoft® Excel®) is one of the standard output formats. If an OOXML file including locale dependent characters is moved to and displayed in another region/language environment, the locale dependent characters are outputted to be displayed in a format in accordance with that region/language environment.

Similarly, a locale setting is set in an image forming apparatus so that menu indications and error indications related to operations thereof are displayed. There is a case where an image forming apparatus is used for handling inputs from an unspecified number of computers or the like. If a user who uses a computer having a certain country's language environment attempts to perform output by an image forming apparatus having another country's language environment, a problem arises that error indications cannot be read if errors occur. Then, in Japanese Patent Application Laid-Open Publication No. 2006-321190, there is disclosed a technology to read a language environment of a received print job, and display error indications in the language.

However, in the case where a document file is outputted as described above, it is not always true that automatic format change thereof based on the locale setting be preferable. If a document file created by a user with no intention to output the document file in a different locale setting environment includes description which depends on the locale setting, and the document file is moved to the different locale setting environment, a display format (output format) of the document file automatically changes on the basis of the locale setting of the environment. As a result, a problem arises that the format of the document file outputted is broken or the document file is displayed differently from what a user has expected. That is, conventional image output apparatuses, which output images of the contents of document files, have a problem that output is performed in accordance with a user's unintentional locale setting.

BRIEF SUMMARY OF THE INVENTION

Objects of the present invention include providing an image output apparatus, an image output method and a program-stored computer readable storage medium, each of which can output images of the contents of a document file as an output target in a region/language setting, namely, a locale setting, which a user intends to use.

In order to achieve at least one of the objects, according to an aspect of the present invention, there is provided an image output apparatus including: an image output unit which outputs, in a predetermined format, an image of a content of a document file; a presumption unit which presumes a first region/language setting of a document file created environment where the document file is created; a comparison unit which compares the first region/language setting with a second region/language setting of the image output apparatus; and an output control unit which makes the image output unit output the image of the content of the document file by using a region/language setting selected from the region/language settings, which are compared with each other by the comparison unit, on the basis of a result of the comparison by the comparison unit in accordance with a predetermined selection condition.

Preferably, in the image output apparatus, the selection condition is set in such a way that the output control unit makes the image output unit output the image by using the first region/language setting in response to the region/language settings, which are compared with each other by the comparison unit, being different from each other.

Preferably, the image output apparatus further includes: a display unit which displays information; and an operation unit which receives an input operation made by a user, wherein the output control unit makes the display unit display the region/language settings in response to the region/language settings, which are compared with each other by the comparison unit, being different from each other, and the selection condition is set in such a way that the output control unit makes the image output unit output the image by using the region/language setting selected from the displayed region/language settings in accordance with the input operation received by the operation unit in response to the region/language settings, which are compared with each other by the comparison unit, being different from each other.

Preferably, in the image output apparatus, the selection condition is set in such a way that the output control unit makes the image output unit output the image by using the region/language settings, which are compared with each other by the comparison unit, in response to the region/language settings being identical.

Preferably, the image output apparatus further includes a detection unit which detects a region/language dependent description part, a display format of which changes depending on the region/language settings, from the document file, wherein the presumption unit presumes the first region/language setting in response to the detection unit detecting the region/language dependent description part, and the output control unit makes the image output unit output the image by using the second region/language setting in response to the presumption unit not presuming the first region/language setting.

Preferably, in the image output apparatus, the presumption unit presumes the first region/language setting on the basis of character encoding information described in the document file.

Preferably, in the image output apparatus, the presumption unit presumes the first region/language setting on the basis of font setting information described in the document file.

BRIEF DESCRIPTION OF THE DRAWINGS

The present invention is fully understood from the detailed description given hereinafter and the accompanying drawings, which are given by way of illustration only, and thus are not intended to limit the present invention, wherein:

FIG. 5 shows an example of description of a styles.xml file;

DETAILED DESCRIPTION OF THE PREFERRED EMBODIMENT

In the following, an embodiment of the present invention is described with reference to the drawings.

Figure 1:
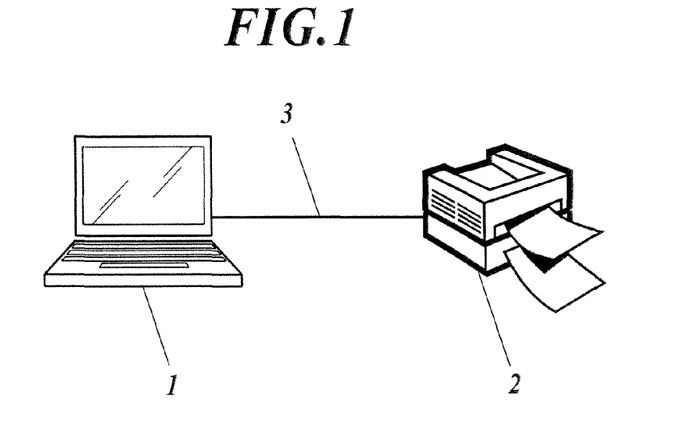
FIG. 1 shows the whole configuration of an image forming system in accordance with an embodiment of the present invention.

FIG. 1 shows the configuration of an image forming system including an image forming apparatus 2 as an embodiment of an image output apparatus of the present invention.

In the image forming system, a computer 1 and the image forming apparatus 2 are connected to each other via a transmission path 3 so as to transfer data therebetween.

The transmission path 3 is for transferring data to/from the computer 1 from/to the image forming apparatus 2. The transmission path 3 is, for example, a wired communication path which uses a cable, such as a LAN (Local Area network) cable, a coaxial cable or an optical fiber, so that the computer 1 and the image forming apparatus 2 are connected to each other via a network; a wireless communication path which uses a wireless communication standard, such as Bluetooth or wireless LAN; or a combination thereof. Any network size, such as LAN or Internet, is applicable to the transmission path 3. The computer 1 and the image forming apparatus 2 may be connected to each other one to one by using a USB cable.

Figure 2:
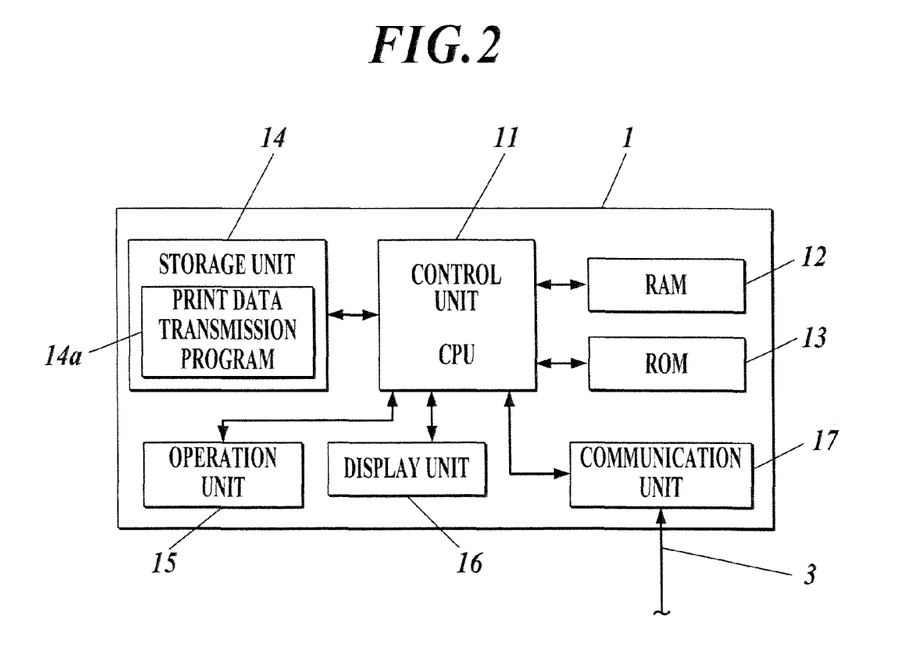
FIG. 2 is a block diagram showing the internal configuration of a computer.

FIG. 2 is a block diagram showing the internal configuration of the computer 1.

Examples of the computer 1 include a laptop PC (Personal Computer), a desktop PC, a PDA (Personal Digital Assistant), a smartphone and a mobile phone.

The computer 1 includes a control unit 11, a RAM (Random Access Memory) 12, a ROM (Read Only Memory) 13, a storage unit 14, an operation unit 15, a display unit 16 and a communication unit 17.

The control unit 11 includes a CPU. The control unit 11 opens in the RAM 12 various programs and data stored in the ROM 13 and the storage unit 14 so as to perform various types of arithmetic processing. In addition, the control unit 11 performs integrated controls on operations of the whole computer 1 on the basis of the programs.

The RAM 12 is a volatile memory to temporarily open various programs executed by the control unit 11, data and the like, and to provide a memory space for work to store temporary data processed by the programs and the like.

The ROM 13 stores control programs, such as a BIOS (Basic Input/Output System) executed by the control unit 11, initialization data and the like in such a way as to be readable. The ROM 13 may be a flash memory, an EEPROM (Electrically Erasable and Programmable Read Only Memory) or the like.

The storage unit 14 stores various types of software, control data and application data in such a way as to be readable, writable and usable. The storage unit 14 is a hard disk in the embodiment, but not limited thereto. The storage unit 14 may be an SSD (Solid State Drive) or the like. The software stored in the storage unit 14 includes a print data transmission program 14a.

The print data transmission program 14a is a program to send OOXML output data files outputted by spreadsheet software (for example, output files by Excel, "Excel files" hereinafter) specified as a print target to the image forming apparatus 2 not via spreadsheet software. The print data transmission program 14a may be able to send print setting information in addition to Excel files.

The storage unit 14 stores spreadsheet software, and can store created spreadsheet data as OOXML Excel files. The storage unit 14 also stores locale setting data for regions and languages in the world so that locale dependent data, such as dates and time, is displayed in a user's desired language in a predetermined format in accordance with a user's setting (region/language setting).

The operation unit 15 converts input operations made by a user into electric signals so as to send the signals to the control unit 11. The operation unit 15 is a keyboard, a touch pad, a mouse or the like.

The display unit 16 displays information in response to commands from the control unit 11. The display unit 16 is a display constituted of an LCD (Liquid Crystal Display) or an organic ELD (Electro-Luminescent Display), for example.

Alternatively, the operation unit 15 and the display unit 16 may be a touch panel which receives both display operations and input operations. The operation unit 15 and the display unit 16 may be connected to the computer 1 as external components, or included in the computer 1 with other components.

The communication unit 17 controls communications to send/receive data to/from the transmission path 3 when connecting the computer 1 to an external apparatus and an external network which are connected to the transmission path 3 so as to make the computer 1 communicate with the external apparatus. The communication unit 17 is an NIC (Network Interface Card), for example.

Figure 3:
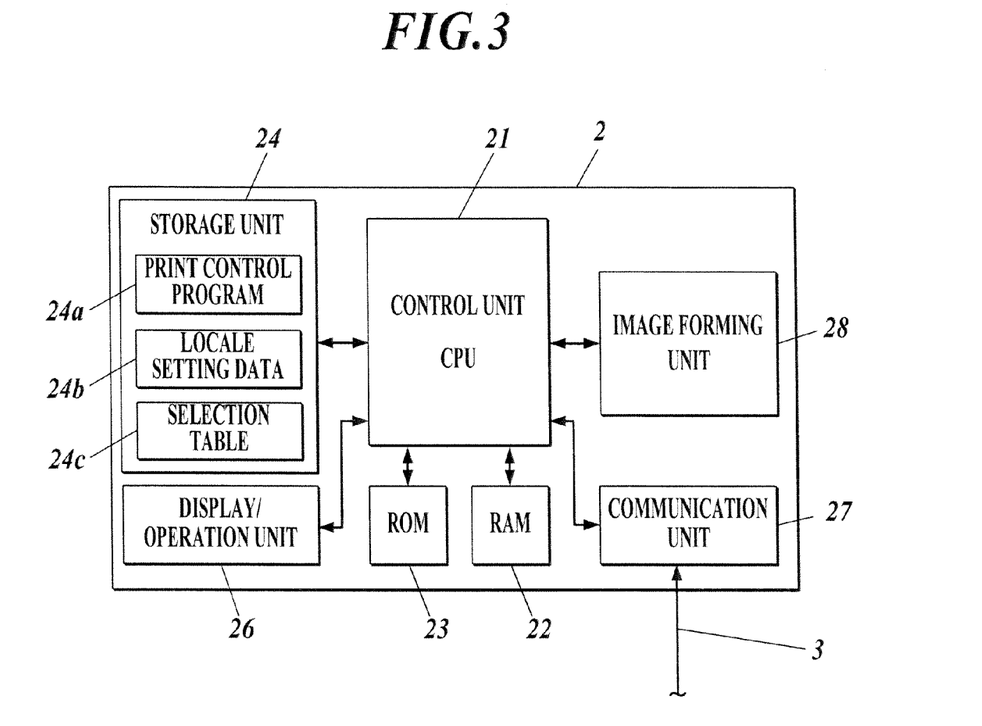
FIG. 3 is a block diagram showing the internal configuration of an image forming apparatus.

FIG. 3 is a block diagram showing the internal configuration of the image forming apparatus 2.

The image forming apparatus 2 includes a control unit 21 (a presumption unit, a comparison unit, an output control unit and a detection unit), a RAM 22, a ROM 23, a storage unit 24, a display/operation unit 26 (a display unit and an operation unit), a communication unit 27, and an image forming unit 28 (an image output unit).

The control unit 21 includes a CPU. The control unit 21 opens in the RAM 22 various programs and data stored in the ROM 23 and the storage unit 24 so as to perform various types of arithmetic processing. In addition, the control unit 21 performs integrated controls on operations of the whole computer 2 on the basis of the programs.

The RAM 22 is a volatile memory to temporarily open the programs executed by the control unit 21, data and the like, and to provide a memory space for work to store temporary data processed by the programs and the like. The ROM 23 stores programs for control processing executed by the control unit 21 and setting data used by the programs in such a way as to be readable.

The storage unit 24 stores various types of software, application data, the print setting information and the Excel files, which are the print target, as input data, in such a way as to be readable, writable and usable. The print setting information and the Excel files are sent from the computer 1. The storage unit 24 is a hard disk in the embodiment, but not limited thereto. The storage unit 24 may be a nonvolatile memory, such as an SSD or an EEPROM.

The software stored in the storage unit 24 includes a print control program 24a, locale setting data 24b for regions and languages in the world, and a selection table 24c which is, as described below, referred to when a locale setting used for image formation (image output) is selected to be determined. The print control program 24a is a program to analyze the contents of each OOXML Excel file, determine a language setting of the file so as to generate image data (DL data or Display List) in an intermediate language for printing, and perform processing (rasterization processing) to generate raster images on the basis of the DL data.

The image forming apparatus 2 may have the above-described software and programs stored in the ROM 23 in advance with no storage unit 24 provided. Alternatively, the image forming apparatus 2 may store the print setting information and the Excel files not in the storage unit 24 but in the RAM 22.

The display/operation unit 26 is an input/output device which displays menus to set a status and a print setting related to a printing operation. In addition, the display/operation unit 26 receives user's input operations so as to generate input signals. The display/operation unit 26 of the embodiment is a touch panel including a pressure sensor and an LCD disposed on top of each other. The pressure sensor detects user's press operations and the pressed positions. The LCD displays information thereon. Alternatively, the display/operation unit 26 may have an operation key or the like as an operation unit and a display constituted of an LCD or an organic ELD as a display unit, for example. The display/operation unit 26 generates input signals on the basis of user's input operations, and outputs the generated input signals to the control unit 21. The operation/display unit 26 displays various setting screens, operation states, processing results and the like in response to display signals outputted from the control unit 21.

The communication unit 27 controls communications to send/receive data to/from the transmission path 3 when connecting the image forming apparatus 2 to an external apparatus and an external network which are connected to the transmission path 3 so as to make the image forming apparatus 2 communicate with the external apparatus. The communication unit 27 is an NIC, for example.

The image forming unit 28 performs image formation (printing) processing on recording material (printing paper) on the basis of raster image data for printing sent from the control unit 21. Although not being particularly limited, examples of the printing method applicable to the image forming unit 28 include electrophotographic printing, inkjet printing, thermal ink transfer printing and offset printing. In the image forming apparatus 2 of the embodiment, the CPU of the control unit 21 generates the raster image data for printing. Alternatively, the image forming apparatus 2 may have an exclusive CPU and an exclusive RAM independent from the control unit 21 so as to generate the raster image data at high speed.

Figure 4:
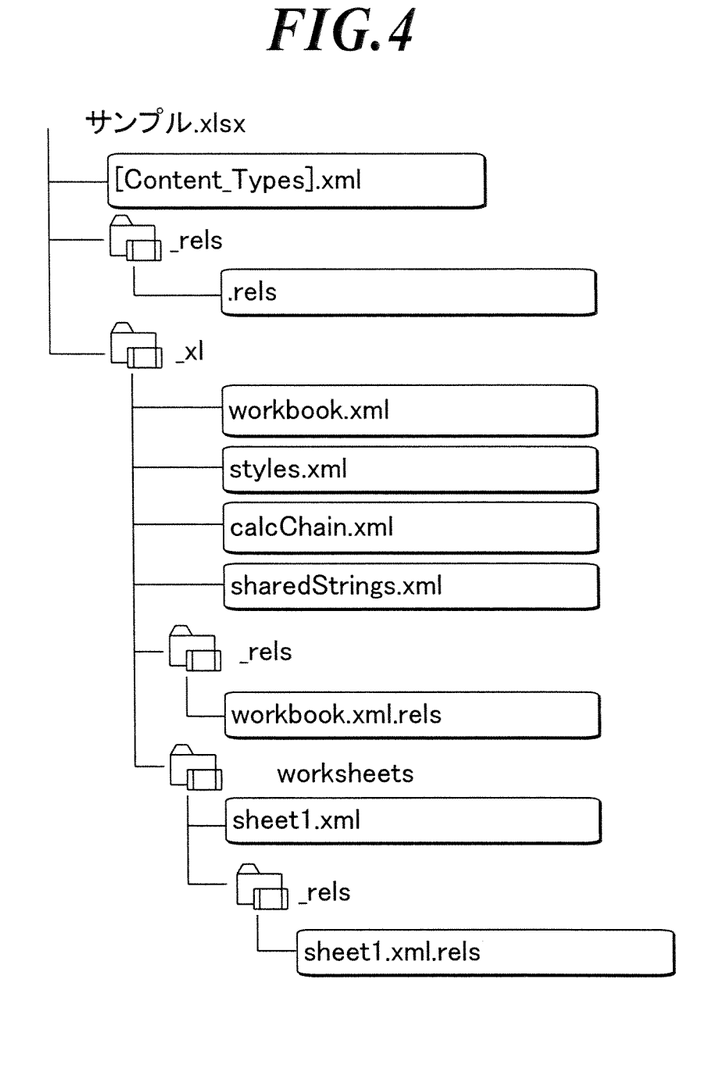
FIG. 4 shows a file structure of an OOXML Excel file.

FIG. 4 shows a file structure of an OOXML Excel file, namely, files included in an OOXML Excel file.

An OOXML Excel file (extension; .xlsx), which is a document file as an image formation target in the image forming apparatus 2 of the embodiment, is an archive file in which at least a plurality of XML files (extension; .xml) and a related file (extension; .rels) are compressed in ZIP and stored. For example, the Excel file (サンプル.xlsx (sample.xlsx) in the embodiment) is constituted of [Content_Types].xml and a file included in a _rels folder and files and folders included in an xl folder.

The xl folder includes a workbook.xml file, a styles.xml file, a calcChain.xml file, a sharedStrings.xml file, a _rels subfolder and a worksheets subfolder.

The workbook.xml file is a file which shows the structure of the whole workbook in the Excel file. The workbook.xml file includes information about which spreadsheet among one or more spreadsheets (data sheets) included in the Excel file is set to be active. The styles.xml file is a style file which holds a language setting, default font information, predetermined description format information and the like with respect to the whole workbook. The calcChain.xml file is a file which includes mathematical formula chain information which indicates a calculation order in each spreadsheet. The sharedStrings.xml file is a file which holds character string data included in each spreadsheet.

The worksheets subfolder stores a sheetY.xml file therein. The "Y" herein is an integer, and indicates a sheet number. In FIG. 4, a sheet1.xml file which includes data of each cell of a first spreadsheet is shown. If there are two or more spreadsheets, the sheetY.xml file for each spreadsheet is created in the worksheets folder. In addition, the worksheets subfolder includes a _rels subsubfolder which holds relation (link) information on each spreadsheet.

Next, a document file as a drawing target in the image forming apparatus 2 of the embodiment is described.

FIG. 5 shows an example of description of the styles.xml file included in the xl folder.

There is a case where a styles.xlm file includes a class "numFmt" which indicates a numerical value description format. In the class "numFmt", an attribute value "formatCode" defines the numerical value description format. In the embodiment, two kinds of a date description format are shown in broken-line frames a1 and a2. By a parameter set as an attribute value "numFmtId", the numerical value description format is called and used in tags xf (shown in a broken-line frame b) which defines formats in a cell format setting.

In the broken-line frame a2, an ID (identifier) "411", namely, "0x0411" in double-byte characters, which indicates Japanese (language) setting of Japan (region), is specified so that dates (years, months and dates) are displayed in Japanese using the name of an era. On the other hand, in the broken-line frame a1, a special ID in a region setting, "0xF800", is specified. The ID "0xF800" specifies that dates are displayed in a language and a format in accordance with the locale setting (region/language setting) of an environment where a document file is used, and when the document file is moved to an environment where a different locale setting is set, a display format of the document file changes. An ID "0xF400" is another specific ID in the region setting, the ID specifying that locale dependent parts, such as dates, are displayed depending on the locale setting.

Figure 6:
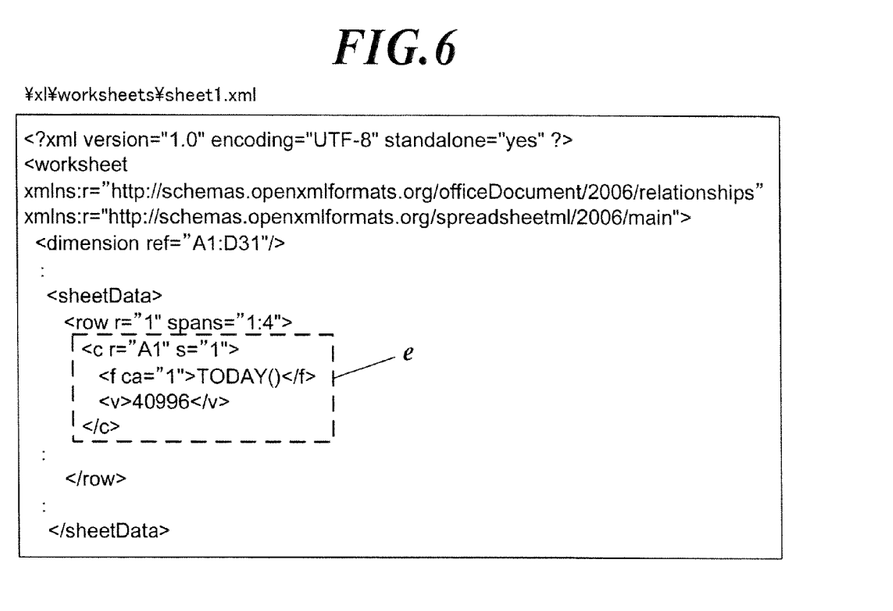
FIG. 6 shows an example of description of a sheet1.xml file.

FIG. 6 shows an example of description of the sheet1.xml file included in the worksheets subfolder.

In the sheet1.xml file, a function TODAY( ) is called as an output content of a cell A1. The function TODAY( ) is a function to obtain and display a date of the time a file is outputted. For the cell A1, as shown in a broken-line frame e, "1" is set to an attribute value s which indicates a style index, and on the basis of the setting of the styles.xml file, date information obtained in accordance with the format code (formatCode), to which numFmtId="176" is set, is displayed in the cell A1. Similarly, a function NOW( ) is a function to obtain and display time (current time) a file is outputted.

Figure 7:
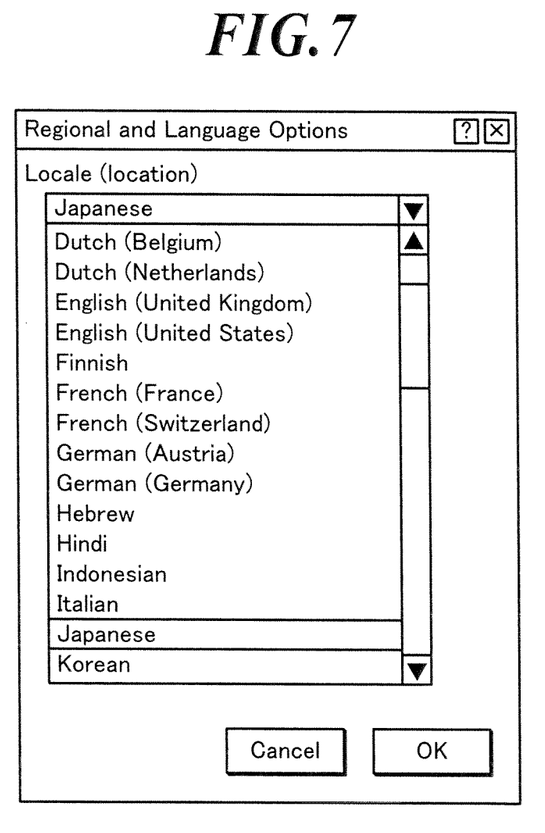
FIG. 7 shows an example of a region/language setting screen.

FIG. 7 shows a locale setting screen (region/language setting screen) of the image forming apparatus 2 of the embodiment.

A user can select and set a desired region/language setting (locale setting) on the locale setting screen. In the embodiment, a user selects Japanese. Hence, if this locale setting is different from the locale setting of the computer 1, a display format of the above-described parts (locale dependent parts or locale dependent description parts), which depend on the locale setting, changes, and the locale dependent parts are outputted in the locale setting of the image forming apparatus 2. Hence, if a user unintentionally allows locale dependent display of a created document file, the document file outputted from the image forming apparatus 2 is different from what the user has expected. Then, in the image forming apparatus 2 of the embodiment, such locale dependent parts are detected from the file data, which is the output target, and if one or more locale dependent parts are detected therefrom, the locale setting of an environment where the file is created (document file created environment) can be presumed and used. Accordingly, the description format of a document file can be prevented from changing depending on the environment (locale setting).

The locale setting of the document file created environment is not clearly stated in an OOXML Excel file. Hence, the locale setting is presumed from description of other contents of the Excel file. More specifically, the locale setting is presumed by detecting description specific to the locale setting on the basis of encoding information (character encoding information), font setting information or the like in the Excel file (text). For example, the header parts of the styles.xml file and the sheet1.xml file each include the encoding information. As shown in a broken-line frame c of FIG. 5, in this Excel file, UFT-8 is used as a character encoding setting. The locale setting cannot be presumed on the basis of UTF-8 alone. However, in UFT-8, for example, the Japanese hiragana is defined by character codes between U+3040 and U+309F. Hence, if characters described in the Excel file are analyzed, and one or more characters having the character codes therebetween are found, the characters (Excel file) can be determined as Japanese. In the case where characters described in a document file are analyzed, the locale setting can be presumed, for example, in a region where the Latin alphabet is mainly used as common characters on the basis of kreska (U+0141 or U+0142 indicating Polish) used for "L" or háček (U+0158 or U+0159 indicating Czech and the like) used for "R". On the other hand, for example, the character encoding "SJIS" is used for Japanese. Hence, if the obtained encoding information is the "SJIS" or the like, the document file created environment thereof can be presumed to be Japanese.

The locale setting can be presumed on the basis of the font setting information (font name) on characters. For example, the "MP P ゴシック (MP P Gothic)" font shown in a broken-line frame d of FIG. 5, the "MS 明朝 (MS Mincho)" font and the like are mainly used for document files (texts) created in Japanese environment. Hence, the locale setting of the document file created environment can be presumed to be Japanese on the basis of this information. If it is difficult to presume the locale setting on the basis of one of the encoding information and the font setting information, the locale setting may be presumed on the basis of both the encoding information and the font setting information. If the locale setting cannot be reasonably presumed on the basis of the encoding information and the font setting information, the locale setting of the document file created environment is determined as "unknown".

Next, an output image forming operation of the image forming apparatus 2 of the embodiment is described.

Figure 8:
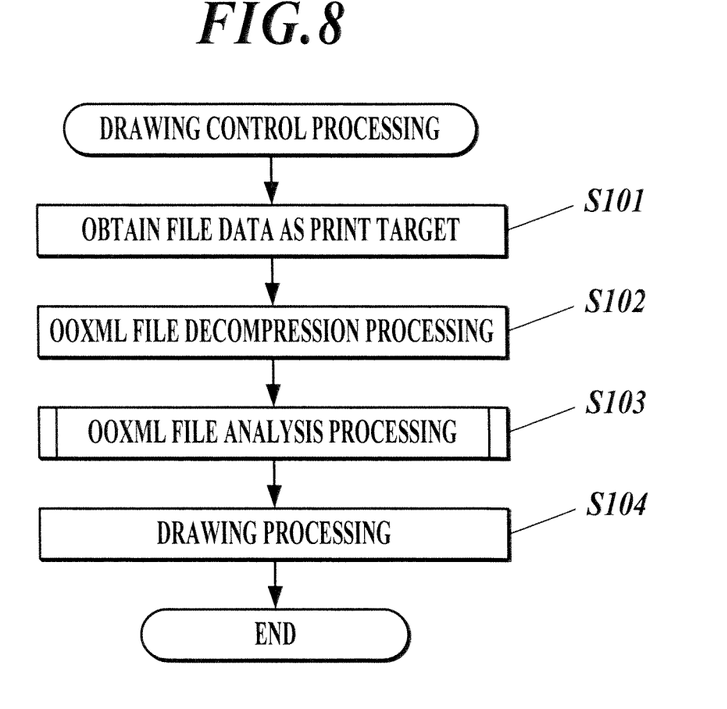
FIG. 8 is a flowchart of a control procedure of drawing control processing.

FIG. 8 is a flowchart of a control procedure of drawing control processing performed by the image forming apparatus 2 of the embodiment, the control procedure being performed by the CPU of the image forming apparatus 2.

The drawing control processing starts when the image forming apparatus 2 receives an output command and Excel data for output images from the computer 1, and accordingly the print control program 24a is called. Alternatively, the drawing control processing may start when the image forming apparatus 2 detects an output command operation made by a user using the operation unit 15.

In the drawing control processing, first, the CPU obtains file data (an OOXML Excel file) as a print target (Step S101). Next, the CPU decompresses the OOXML Excel file compressed in ZIP (Step S102). Then, the CPU performs analysis processing (OOXML file analysis processing) on the decompressed OOXML Excel file (decompressed files included in the OOXML Excel file) as an output target so as to create intermediate data (DL data) (Step S103). Finally, the CPU performs drawing processing of a raster image file on the basis of the intermediate data, and outputs the raster image file to the image forming unit 28 (Step S104), and then ends the drawing control processing.

Figure 9:
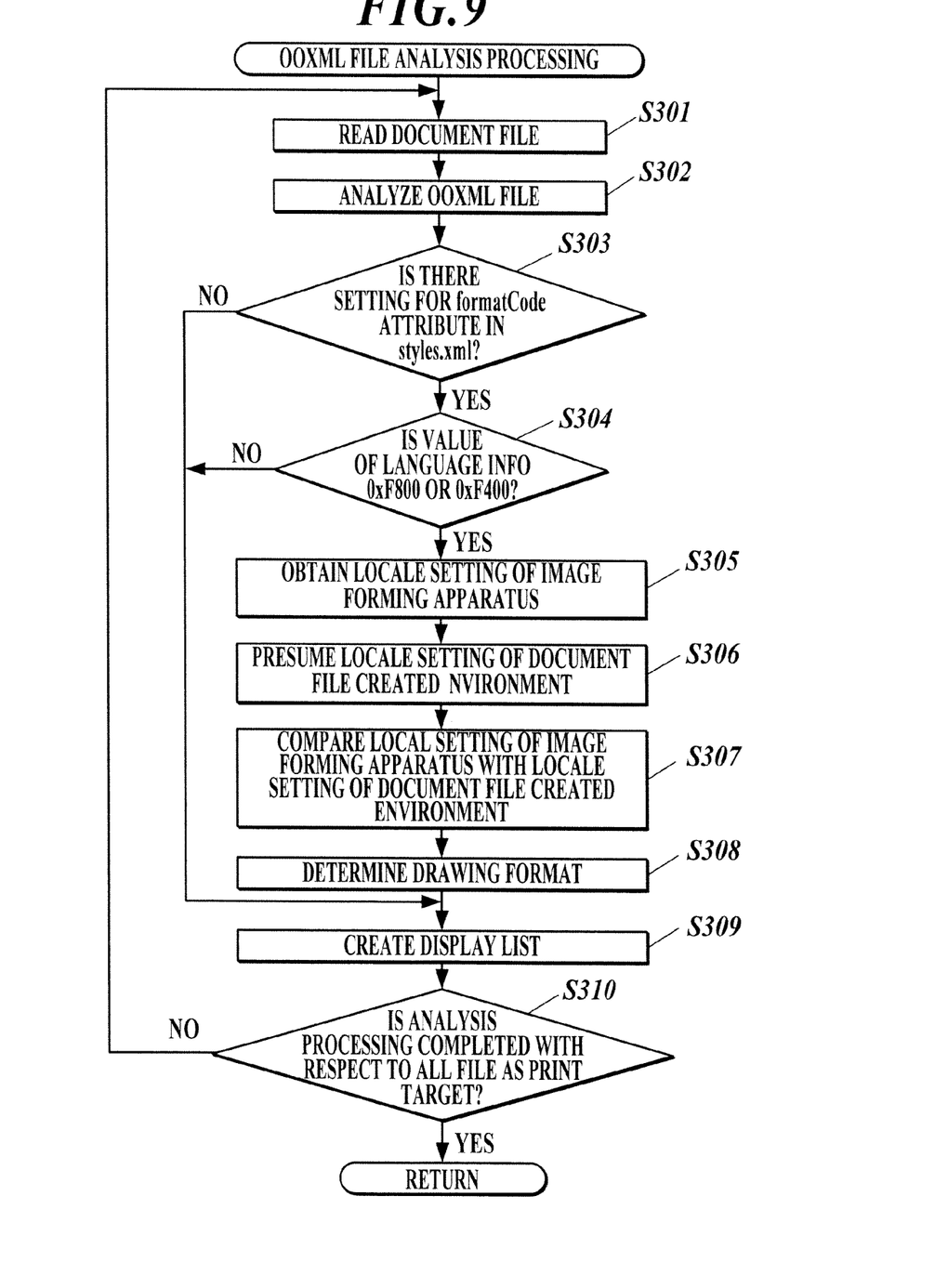
FIG. 9 is a flowchart of OOXML file analysis processing.

FIG. 9 is a flowchart of a control procedure of the OOXML file analysis processing called by the drawing control processing, the control procedure being performed by the CPU of the image forming apparatus 2.

First, the CPU reads the files (the sheetY.xml file and related file or files thereto) of the OOXML Excel file as a drawing target in order (Step S301). Then, the CPU performs syntax analysis on the read files (Step S302). Next, the CPU determines whether or not description to set the attribute value "formatCode" exists in the styles.xml file (Step S303). When determining that the description to set the attribute value "formatCode" does not exist therein (Step S303; NO), the CPU proceeds to Step S309. On the other hand, when determining that the description to set the attribute value "formatCode" exists therein (Steep S303; YES), the CPU further determines whether or not a value of Language info in a parameter which indicates a language and a region being "0xF800" or "0xF400" exists (Step S304). When determining that the value being "0xF800" or "0xF400" does not exist (Step S304; NO), the CPU proceeds to Step S309.

On the other hand, when determining that the value being "0xF800" or "0xF400" exists (Step S304; YES), the CPU obtains the locale setting set in the image forming apparatus 2 (Step S305). Next, the CPU refers to the locale setting data 24b so as to presume the locale setting of the document file created environment (Step S306).

Next, the CPU compares the obtained locale setting of the image forming apparatus 2 with the presumed locale setting of the document file created environment (Step S307), and determines a locale setting used for image output on the basis of the comparison result in accordance with a preset standard (selection condition).

Figure 10:
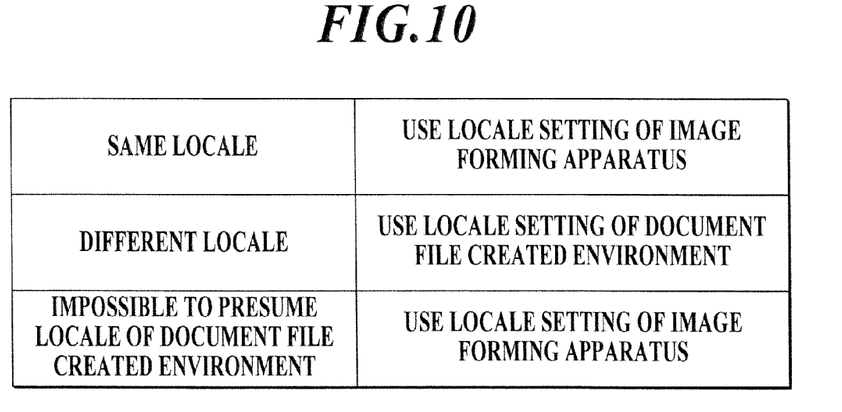
FIG. 10 shows an example of a table for selecting a region/language setting used for drawing processing.

FIG. 10 shows an example of a table to determine the locale setting at Step S307.

In the image forming apparatus 2 of the embodiment, the selection table 24c corresponding to the table shown in FIG. 10 is stored in the storage unit 24 in advance, and the CPU determines the locale setting at Step S307 referring to the selection table 24c (selection condition). If the locale setting of the image forming apparatus 2 is the same as the locale setting of the document file created environment, the CPU uses this locale setting. That is, the CPU performs image output in the locale setting originally set in the image forming apparatus 2. Also, if the locale setting of the document file created environment cannot be presumed, the CPU uses the locale setting of the image forming apparatus 2. On the other hand, if the locale setting of the image forming apparatus 2 is different from the locale setting of the document file created environment, the CPU uses the locale setting of the document file created environment, the locale setting being presumed. Accordingly, outputting a document file (texts) in an unintentional description format due to the locale setting of the image forming apparatus 2 can be avoided. The image forming apparatus 2 of the embodiment can promptly determine the locale setting at Step S307 by referring to the selection table 24c.

Figure 11:
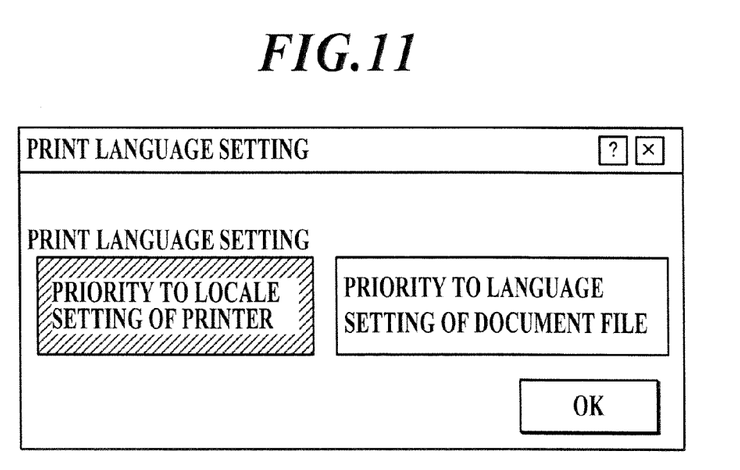
FIG. 11 shows an example of a selection screen for selecting the region/language setting for the drawing processing.

In the case where the locale setting of the image forming apparatus 2 is different from the locale setting of the document file created environment, a selection screen may be displayed on the display/operation unit 26 so that a user can select one of the locale settings, namely, the locale setting of the image forming apparatus 2 and the locale setting of the document file created environment.

FIG. 11 shows an example of the contents displayed on the selection screen for selecting the locale setting.

Thus, by requesting a user to make an input operation only when the locale setting of the image forming apparatus 2 is different from the locale setting of the document file created environment, such trouble is not given to the user usually, namely, when unnecessary. That is, a user appropriately selects and sets the locale setting only when necessary. The number of locale settings from which a user can select is not limited to two. For example, if a plurality of candidates as the locale setting of the document file created environment are extracted at Step S306, and none of the candidates agrees with the locale setting of the image forming apparatus 2 or no matter whether any of the candidates agrees with the locale setting of the image forming apparatus 2, all the candidates and the locale setting of the image forming apparatus 2 may be displayed on the display/operation unit 26 so that a user can make a selection operation to select the locale setting from the candidates and the locale setting of the image forming apparatus 2.

Then, the CPU determines a drawing format for the analyzed files of the OOXML Excel file as the output target on the basis of the determined locale setting (Step S308), and then proceeds to Step S309.

The CPU creates Display List (DL data), which is the intermediate data for the output images, for each page. Then, the CPU determines whether or not the analysis and the DL data creation are completed with respect to all the files as the output target (Step S310). When determining that the analysis and the DL data creation are not completed with respect to all the files as the output target (Step S310; NO), the CPU returns to Step S301 so as to read data of the next file as the output target, and repeats Steps S301 to S310. On the other hand, when determining that the analysis and the DL data creation are completed with respect to all the files as the output target (Step S310; YES), the CPU ends the OOXML file analysis processing, and returns to the drawing control processing.

As described above, in the image forming apparatus 2 of the embodiment, the locale setting of the document file created environment of a document as an output target is presumed, and the presumed locale setting is compared with the locale setting of the image forming apparatus 2. Then, on the basis of the comparison result, an appropriate locale setting for image formation is selected by a predetermined selection method so that image formation of the document file is performed. Accordingly, a user can avoid outputting images of the contents of a document file in the display format of an unintentional language. Furthermore, a user can avoid changing the display format of a document file to the display format of an unintentional language, and accordingly can avoid breaking the format of the document file and outputting the document file in the broken format.

In particular, in the image forming apparatus 2, in the case where the presumed locale setting is different from the locale setting of the image forming apparatus 2, image formation can be performed on the basis of the presumed locale setting. Accordingly, even if a user does not notice that locale dependent parts exist in a created document file, or does not assume at the time when creating the document file that image formation of the document file is performed in another locale setting environment, image formation can be performed in the locale setting of the document file created environment.

Furthermore, in the case where the presumed locale setting is different from the locale setting of the image forming apparatus 2, the selection screen on which these locale settings are displayed is displayed on the display/operation unit 26 so that a user can make a selection operation. Accordingly, image formation can be certainly performed in a user's desired locale setting. In addition, by requesting a user to make a selection operation only when the presumed locale setting is different from the locale setting of the image forming apparatus 2, and limiting the locale settings from which a user can select the locale setting for image formation to the presumed locale setting and the locale setting of the image forming apparatus 2, unnecessary trouble is not given to the user.

Furthermore, in the case where the presumed locale setting is the same as the locale setting of the image forming apparatus 2, image formation can be performed in the locale setting originally set in the image forming apparatus 2. Accordingly, image formation can be performed in a user's desired locale setting without additional processing.

Furthermore, in the image forming apparatus 2, the contents of a document file as a print target are analyzed, and it is determined whether or not a locale setting dependant part, the format of which changes depending on the locale setting, exists in the document file, and only when the locale dependent part is detected, the locale setting of the document file created environment is presumed, and the locale setting for image formation is determined. That is, when the locale dependent part is not detected, the locale setting of the document file created environment is not presumed, and also the locale setting for image formation is not determined. Accordingly, unnecessary increase of the image formation processing can be prevented.

In particular, in the case where image formation of an OOXML Excel file is performed, whether or not a locale dependent part exists is determined only by checking the attribute value "formatCode" near the header part of the styles.xml file. Accordingly, the processing for the locale setting can be easily performed without increasing the contents of the processing much.

Furthermore, the encoding information, the font setting information and/or the character codes of characters described in a document file is used for presuming the locale setting of the document file created environment. Accordingly, the locale setting of the document file created environment can be presumed without intricate processing.

In particular, in the case of a language which is very different from that of another region, such as Japanese, Korean or Chinese, the locale setting of the document file created environment can be easily and accurately presumed.

The present invention is not limited to the embodiment described above, and hence can be variously modified.

For example, in the embodiment, an OOXML Excel file is outputted. Alternatively, a document file in another format may be used. For example, the present invention can be applied to outputting an ODF (Open Document Format) spreadsheet data file. In ODF, the display format of locale dependent parts, such as dates, time and currencies, changes depending on the locale setting unless a display language or a description format of the locale dependent parts is clearly stated and set. Hence, the locale setting for outputting images of the contents of an ODF document file may be determined on the basis of determination whether or not the display language or the description format is set in a number format specified part for a date, time or the like. Furthermore, the present invention can be applied to outputting images of the contents of not only a document file in a standard format but also a document file which can use a locale setting, such as a document file using a structured language, so as to detect a locale dependent part, presume the locale setting of the document file created environment when detecting the locale dependent part, and use the presumed locale setting for outputting the images. Examples of the structured language include the XML language, the HTML language and the XHTML language.

In the embodiment, in the case where the locale setting of the image forming apparatus 2 is different from the locale setting of the document file created environment, priority is given to the locale setting of the document file created environment. However, image output can also be performed in accordance with the locale setting of the image forming apparatus 2 as is conventionally done. In this case, for example, print setting data sent with a print job from the computer 1 may include priority setting information indicating that priority is given to the locale setting of the image forming apparatus 2. Alternatively, image output may be performed on the basis of the locale setting of the image forming apparatus 2.

In the embodiment, the image forming apparatus 2, which performs printing on paper or the like, is described as an image output apparatus. However, the output method is not limited to printing. For example, in a case where Excel data is included in a presentation, and images to be projected on a screen are outputted from a computer which is different from the document file created environment, display of the output images may be set to be independent from the locale setting of the computer. Furthermore, the present invention can be applied to displaying a received electronic document file on a portable terminal, such as a smartphone.

In the embodiment, the image forming apparatus 2 includes the print control program 24a, and determines the locale setting for image formation so as to perform image formation. However, for example, a print server may include a program similar to the print control program 24a, and output generated raster image data or DL data to the image forming apparatus 2 so that the image forming apparatus 2 performs image formation.

In the embodiment, dates and time are described as examples of locale dependent parts. Similarly, the present invention can be applied to determining whether or not the locale setting of an image forming apparatus is used for outputting other locale dependent parts, such as currency symbols and a notational system for numerical values.

In the embodiment, for presuming the locale setting of the document file created environment, the encoding information, the font information and the character codes of characters (character code information) in a document file are used. However, the locale setting of the document file created environment may be presumed by another method. For example, the locale setting thereof may be presumed on the basis of a specific keyword, such as an article, a pronoun or a numeral, by performing language analysis on a text (or texts) to be outputted.

In the embodiment, one locale setting for image formation is selected with respect to one document file to be outputted. However, for example, in a case where document files created under a plurality of locale settings are outputted as one document file, different locale settings may be presumed part by part, for example, sentence by sentence or page by page. In this case, the image forming apparatus 2 may select different locale settings for the respective parts so that image formation is performed.

In the embodiment, the storage unit 24 constituted of a hard disk or an SSD is used as a computer readable storage medium to store the programs of the present invention. However, this is not a limitation but an example. Hence, for example, a nonvolatile memory, such as a ROM, a portable storage medium, such as a CD-ROM or a DVD, can be used as the computer readable storage medium. Furthermore, a carrier wave can be used as a medium which provides data of the programs of the present invention via a communication line.

Furthermore, details of the present invention described in the embodiment, such as the specific configurations and the determination conditions, which includes the selection condition, can be appropriately modified without departing from the spirit of the present invention.

This application is based upon and claims the benefit of priority under 35 USC 119 of Japanese Patent Application No. 2012-111324 filed on May 15, 2012, the entire disclosure of which, including the description, claims, drawings and abstract, is incorporated herein by reference in its entirety.

What is claimed is:

1. An image output apparatus comprising:
an image output unit which outputs, in a predetermined format, an image of a content of a document file;
a determination unit which determines, based on the content of the document file, a first region/language setting of a document file created environment where the document file is created;
a comparison unit which compares the first region/language setting with a second region/language setting obtained from the image output apparatus; and
an output control unit which selects among outputting the image by using the first region/language setting and outputting the image by using the second region/language setting from the first and second region/language settings, which are compared with each other by the comparison unit, on the basis of a result of the comparison by the comparison unit in accordance with a predetermined selection condition, and makes the image output unit output the image of the content of the document file by using the selected region/language setting.

2. The image output apparatus according to claim 1, wherein the predetermined selection condition is set in such a way that the image is output by using the first region/language setting in response to the first and second region/language settings, which are compared with each other by the comparison unit, being different from each other, and
when the first and second region/language settings, which were compared with each other by the comparison unit, are different from each other, the output control unit selects outputting the image by using the first region/language setting in accordance with the predetermined selection condition, and makes the image output unit output the image of the content of the document file by using the first region/language setting.

3. The image output apparatus according to claim 1 further comprising:
a display unit which displays information; and
an operation unit which receives an input operation made by a user, wherein
the output control unit makes the display unit display the first and second region/language settings in response to the first and second region/language settings, which are compared with each other by the comparison unit, being different from each other, and
the predetermined selection condition is set in such a way that the output control unit makes the image output unit output the image by using the region/language setting selected from the displayed region/language settings in accordance with the input operation received by the operation unit in response to the first and second region/language settings, which are compared with each other by the comparison unit, being different from each other.

4. The image output apparatus according to claim 1, wherein the predetermined selection condition is set in such a way that the output control unit makes the image output unit output the image by using the second region/language setting in response to the first and second region/language settings being identical.

5. The image output apparatus according to claim 1 further comprising a detection unit which detects a region/language dependent description part, a display format of which changes depending on the first and second region/language settings, from the document file, wherein
the determination unit determines the first region/language setting in response to the detection unit detecting the region/language dependent description part, and
the output control unit makes the image output unit output the image by using the second region/language setting in response to the determination unit not determining the first region/language setting.

6. The image output apparatus according to claim 5, wherein the detection unit detects a predetermined identifier from the document file, the identifier indicating that the document file includes the region/language dependent description part.

7. The image output apparatus according to claim 6, wherein
the document file is described in OOXML, and
the identifier is one of 0xF800 and 0xF400, each of which indicates a language setting in an attribute value formatCode.

8. The image output apparatus according to claim 1, wherein the determination unit determines the first region/language setting on the basis of character encoding information described in the document file.

9. The image output apparatus according to claim 1, wherein the determination unit determines the first region/language setting on the basis of font setting information described in the document file.

10. The image output apparatus according to claim 8, wherein the determination unit determines the first region/language setting on the basis of a character code of a character to be outputted included in the document file.

11. The image output apparatus of claim 1, further comprising a detection unit which detects a region/language dependent description part, a display format of which changes depending on the first and second region/language settings, from the document file, wherein
the output control unit makes the image output unit output the image corresponding to the detected region/language dependent description part by using the region/language setting selected from the first and second region/language settings, which are compared with each other by the comparison unit, on the basis of the result of the comparison by the comparison unit in accordance with the predetermined selection condition.

12. An image output method comprising:
an image output step of outputting, in a predetermined format, an image of a content of a document file;
a determination step of determining, based on the content of the document file, a first region/language setting of a document file created environment where the document file is created;
a comparison step of comparing the first region/language setting with a predetermined second region/language setting obtained from an image output apparatus; and
an output control step including selecting among outputting the image by using the first region/language setting and outputting the image by using the second region/language from the first and second region/language settings, which are compared with each other in the comparison step, on the basis of a result of the comparison in the comparison step, and making the outputting of the image be performed by using the selected region/language setting.

13. The image output method according to claim 12, wherein in the output control step, the image is made to be outputted in the image output step in response to the first and second region/language settings being compared with each other in the comparison step, and when the first and second region/language settings, which were compared with each other in the comparison step, are different from each other, then the output control step selects to output the image by using the first region/language setting, and makes the outputting of the image be performed by using the first selected region/language setting.

14. The image output method according to claim 12, wherein in the output control step, in response to the first and second region/language settings, which are compared with each other in the comparison step, being different from each other,
a display unit is made to display the first and second region/language settings, and
the image is made to be outputted in the image output step by using the region/language setting selected from the first and second displayed region/language settings in accordance with an input operation made by a user and received by an operation unit.

15. The image output method according to claim 12, wherein in the output control step, the image is made to be outputted in the image output step by using the second region/language setting in response to the first and second region/language settings being identical.

16. The image output method according to claim 12 further comprising a detection step of detecting a region/language dependent description part, a display format of which changes depending on the first and second region/language settings, from the document file, wherein
in the determination step, the first region/language setting is determined in response to detecting the region/language dependent description part in the detection step, and
in the output control step, the image is made to be outputted in the image output step by using the second region/language setting in response to not determining the first region/language setting in the determination step.

17. The image output method of claim 12, further comprising a detection step of detecting a region/language dependent description part, a display format of which changes depending on the first and second region/language settings, from the document file, wherein
in the output control step, the image corresponding to the detected region/language dependent description part is made to be outputted by using the region/language setting selected from the first and second region/language settings, which are compared with each other in the comparison step, on the basis of the result of the comparison in the comparison step.

18. A non-transitory computer readable storage medium allowing a computer to function as:
an image output unit which outputs, in a predetermined format, an image of a content of a document file;
a determination unit which determines, based on the content of the document file, a first region/language setting of a document file created environment where the document file is created;
a comparison unit which compares the first region/language setting with a second region/language setting obtained from the computer; and
an output control unit which selects among outputting the image by using the first region/language setting and outputting the image by using the second region/language setting from the first and second region/language settings, which are compared with each other by the comparison unit, on the basis of a result of the comparison by the comparison unit, and makes the image output unit output the image of the content of the document file using the selected region/language setting.

19. The non-transitory computer readable storage medium according to claim 18, wherein the output control unit makes the image output unit output the image in response to the first and second region/language settings being compared with each other by the comparison unit, and when the first and second region/language settings, which were compared with each other by the comparison unit, are different from each other, the output control unit selects outputting the image by using the first region/language setting, and makes the image output unit output the image of the content of the document file using the first region/language setting.

20. The non-transitory computer readable storage medium according to claim 18 further allowing the computer to function as:
a display unit which displays information; and
an operation unit which receives an input operation made by a user, wherein
in response to the first and second region/language settings, which are compared with each other by the comparison unit, being different from each other, the output control unit makes the display unit display the first and second region/language settings, and makes the image output unit output the image by using the region/language setting selected from the displayed region/language settings in accordance with the input operation received by the operation unit.

21. The non-transitory computer readable storage medium according to claim 18, wherein the output control unit makes the image output unit output the image by using second region/language setting in response to the first and second region/language settings being identical.

22. The non-transitory computer readable storage medium according to claim 18 further allowing the computer to function as a detection unit which detects a region/language dependent description part, a display format of which changes depending on the first and second region/language settings, from the document file, wherein
the determination unit determines the first region/language setting in response to the detection unit detecting the region/language dependent description part, and
the output control unit makes the image output unit output the image by using the second region/language setting in response to the determination unit not determining the first region/language setting.

23. The non-transitory computer readable storage medium according to claim 18, further allowing the computer to function as a detection unit which detects a region/language dependent description part, a display format of which changes depending on the first and second region/language settings, from the document file, wherein
the output control unit makes the image output unit output the image corresponding to the detected region/language dependent description part by using the region/language setting selected from the first and second region/language settings, which are compared with each other by the comparison unit, on the basis of the result of the comparison by the comparison unit.

* * * * *